United States Patent
Chliwnyj et al.

(10) Patent No.: US 6,798,608 B2
(45) Date of Patent: Sep. 28, 2004

(54) ACTIVE DETECTION AND ACQUISITION OF A SERVO TRACK SUBJECT TO LATERAL MOTION

(75) Inventors: Alex Chliwnyj, Tucson, AZ (US); David Michael Davis, Tucson, AZ (US); David Lee Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 10/050,522

(22) Filed: Jan. 18, 2002

(65) Prior Publication Data

US 2003/0137768 A1 Jul. 24, 2003

(51) Int. Cl.[7] .............................. G11B 5/584
(52) U.S. Cl. .................. 360/77.12; 360/78.04
(58) Field of Search .................. 360/77.12, 78.04, 360/75, 76, 77.01, 78.01, 78.02

(56) References Cited

U.S. PATENT DOCUMENTS

| | | | |
|---|---|---|---|
| 4,472,750 A | 9/1984 | Klumpp et al. | 360/78 |
| 5,121,270 A | 6/1992 | Alcudia et al. | 360/77.01 |
| 5,404,252 A | 4/1995 | Nagasawa et al. | 360/77.16 |
| 5,448,430 A | 9/1995 | Bailey et al. | 360/77.16 |
| 5,483,394 A | 1/1996 | Harman | 360/77.12 |
| 5,629,813 A | 5/1997 | Baca et al. | 360/77.12 |
| 5,936,792 A | 8/1999 | Kobayashi et al. | 360/78.06 |
| 5,946,159 A | 8/1999 | Chliwnyj et al. | 360/77.12 |
| 5,995,315 A | 11/1999 | Fasen | 360/77.01 |

*Primary Examiner*—David Hudspeth
*Assistant Examiner*—Jason Olson
(74) *Attorney, Agent, or Firm*—John H. Holcombe

(57) ABSTRACT

Initially, from an off-track position at a known side of, and displaced from, a servo track pattern of a tape subject to lateral movement, servo loop logic slews a tape head servo sensor laterally toward the pattern at a rate greater than the maximum rate of lateral movement of the tape. Upon detecting sensed servo signals, the logic decelerates the slewing rate. Upon detecting that the sensed servo signals are within a lock window tolerance, the logic locks a servo loop to a position error signal representing the current lateral position of the servo sensor, thereby acquiring the servo pattern.

18 Claims, 4 Drawing Sheets

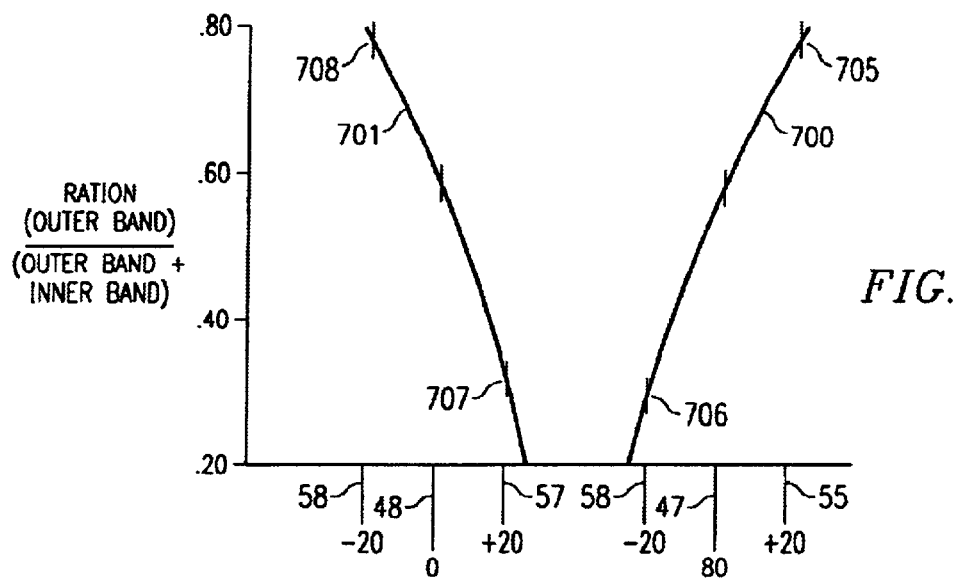
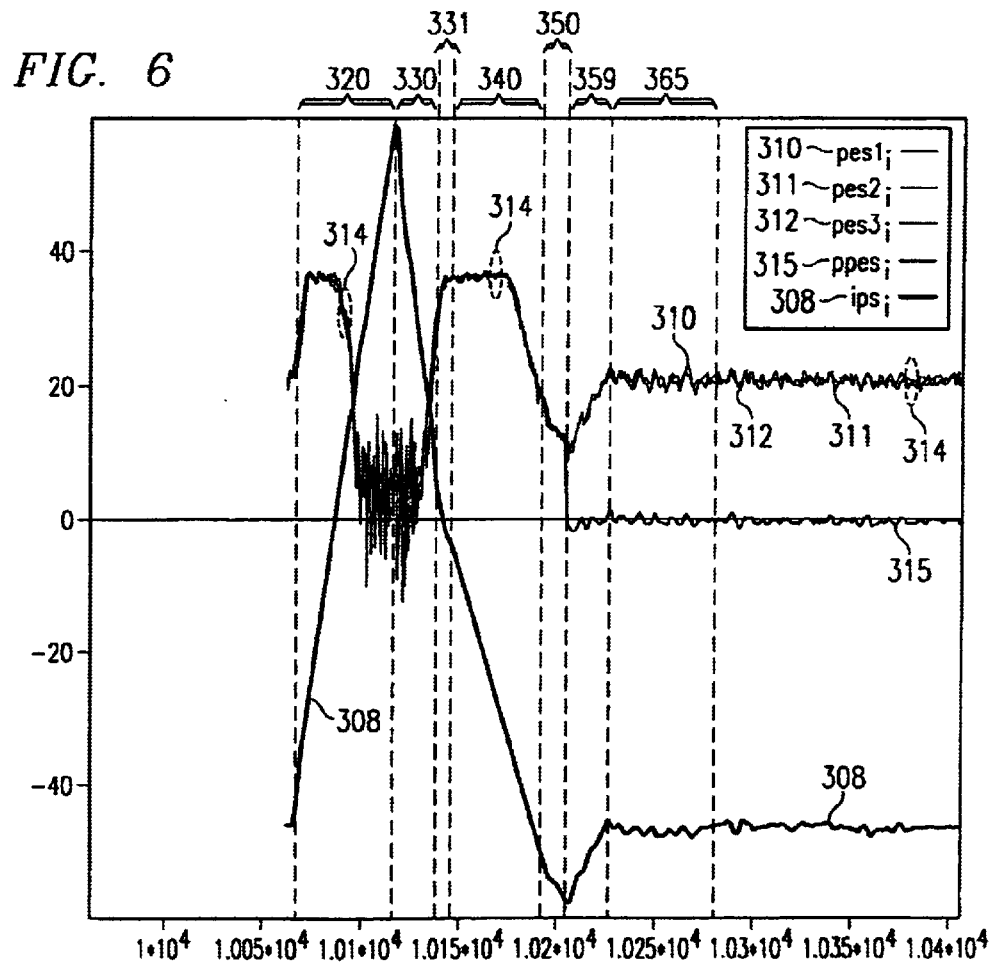

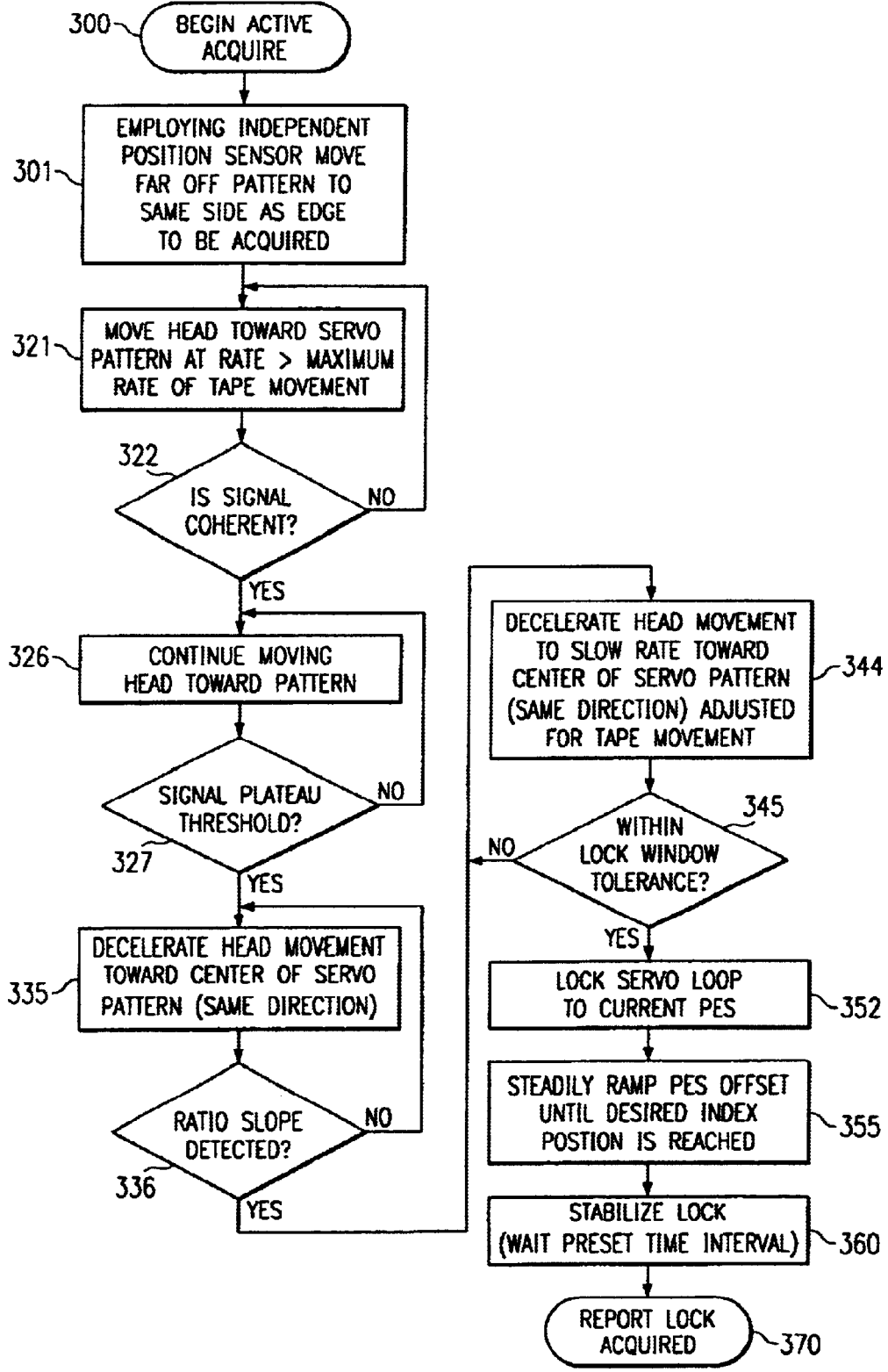

ACTIVE DETECTION AND ACQUISITION OF A SERVO TRACK SUBJECT TO LATERAL MOTION

DOCUMENTS INCORPORATED BY REFERENCE

Commonly assigned U.S. Pat. No. 5,946,159, is incorporated for its showing of a track following servo system for following servo track edges of dissimilar servo signals, and employing a non-servo, or independent, position sensor. Commonly assigned U.S. patent application Ser. No. 09/413,327, filed Oct. 7, 1999, is incorporated for its showing of a servo position detector and a method for detecting and track following a servo index position displaced with respect to an edge of a servo track.

FIELD OF THE INVENTION

This invention relates to servo systems for laterally positioning data heads with respect to magnetic-tape, and, more particularly, to detecting and acquiring a track following servo pattern recorded on the magnetic tape.

BACKGROUND OF THE INVENTION

Magnetic tape provides a means for physically storing data which may be archived or which may be stored in storage shelves of automated data storage libraries and accessed when required. One method for maximizing the amount of data that can be stored is to maximize the number of parallel tracks on the media, and this is typically accomplished by employing servo systems which provide track following and allow the tracks to be spaced very closely.

Track following servo systems for magnetic tape data storage typically comprise a track following servo pattern of prerecorded servo tracks to allow precise positioning of a tape head which has servo sensors, with respect to the servo tracks. An example of a magnetic tape drive with a track following servo system is the IBM 3590 Magstar. The tape head comprises one or more read/write elements precisely positioned with respect to the servo sensors and which trace data tracks,parallel to the servo tracks. One example of a magnetic tape track following servo system is discussed in the incorporated U.S. Pat. No. 5,946,159, which employs magnetic tape having prerecorded servo patterns that include three parallel sets of servo edges, each servo edge being an interface between two dissimilar recorded servo signals, each set of servo edges comprising one servo edge on each of opposite lateral sides of a middle recorded servo signal. The middle recorded servo signal comprises a binary sequence of bursts, and the outer recorded servo signals comprise constant frequency recorded signal.

In the incorporated U.S. Pat. No. 5,946,159, the tape head has several spaced apart servo sensors for each servo edge, with the result that the tape head may be stepped between the servo sensors, each positioning the read/write elements at different interleaved groups of data tracks.

To further increase track density, a servo sensor may be indexed to positions laterally offset from the linear servo edges to provide further interleaved groups of data tracks. An example of a track following servo system for following an index servo position displaced with respect to an edge of a servo track is discussed in the incorporated U.S. patent application Ser. No. 09/413,327. In the example, the index positions are determined by measuring the ratio between the amplitudes of the two dissimilar recorded servo signals. Specifically, the middle recorded servo signal comprises binary bursts, and the outer servo signals comprise a constant frequency. The detected ratios, when the servo sensor senses both the outer recorded servo signal and the binary burst middle recorded servo signal, comprise ratios of the outer signal in the area where there is no binary burst, to the sum of the middle and outer signals in the area where there is a binary burst. As the servo sensor progresses from the outer signal, across the edge, to the middle servo signal, the ratios have a slope, and the index positions are positioned along the slope at specific ratios.

The tape path of tape drives such as the above IBM 3590 Magstar is a guided tape path, limiting the lateral movement of the magnetic tape. Another approach is open channel guiding in which the magnetic tape can move laterally a distance which is substantially greater than the distance between index positions and may be greater than the width of at least half of the servo pattern.

A function of magnetic tape is to maximize the data stored on the tape by insuring that there are only limited gaps between groups of data. One method of accomplishing this function is to stop the longitudinal movement of the magnetic tape and "backhitch", or reverse to beyond the end of the previous data, stop again, and accelerate up to speed in the original direction by the time that the end of the previous data is reached.

When the magnetic tape is guided in a guided tape path, the magnetic tape tends to stay in nearly the same lateral position as it is backhitched, so that the servo sensor is on the track following servo pattern at nearly the correct offset when it is accelerated up to speed in the original direction, and the servo system can move to the desired index position by the time the next data is to be written.

In open channel guiding, the lateral movement of the magnetic tape is much greater. Additionally, even with a guided path, some tapes become "ill behaved", and move laterally substantial distances. A complication is that the servo signals on one side of the track following servo pattern are similar to that on the other side of the pattern, differing only in the direction of slope of the ratios. Thus, a single sample will not indicate the side of track following servo pattern, and any adjustment in what is thought to be the correct direction will move the servo sensor off of the servo pattern, such that the servo system may become lost. Further, the lateral movement of the magnetic tape may be so great that the servo sensor is off of the track following servo pattern entirely when the longitudinal direction of the tape is started in the original direction. No servo position information is available once the servo sensor moves outside the pattern. An independent position sensor, such as that of U.S. Pat. No. 5,946,159, cannot be relied on to determine the correct position within a servo pattern, when such large tape movements are involved. Additionally, as tape moves to even higher track densitities, the problem of lateral movement becomes greater, even with a guided tape path.

SUMMARY OF THE INVENTION

It is an object of the present invention to detect and acquire a track following servo pattern of a magnetic tape that is subject to lateral motion.

In one embodiment, a servo system detects and acquires a track following servo pattern of a magnetic tape, wherein the magnetic tape is subject to lateral motion. The magnetic tape has a track following servo pattern of at least one set of parallel linear servo edges, each servo edge comprising an interface between two dissimilar recorded servo signals, each set of servo edges comprising an outer recorded servo signal on each of opposite lateral sides of a middle recorded servo signal.

The servo system comprises at least one servo sensor of a tape head, wherein the tape head is movable laterally of the magnetic tape. The servo sensor senses the recorded servo signals of the magnetic tape and provides sensed servo signals. A servo loop positions the tape head laterally with respect to the magnetic tape.

Servo loop logic is coupled to the servo sensor and to the servo loop. Initially, from an off-track position of the tape head servo sensor at a known side of, and displaced from, the track following servo pattern, the servo loop logic operates the servo loop to slew the tape head and thereby, the tape head servo sensor, laterally toward the track following servo pattern at a rate greater than the maximum rate of lateral movement of the magnetic tape. The servo loop logic monitors the signals of the servo sensor as the tape head servo sensor is slewed, to detect the servo signals. Upon detecting the sensed servo signals, the servo loop logic decelerates the slewing rate. Then, upon detecting that the sensed servo signals are within a lock window tolerance, the servo loop logic locks the servo loop to a position error signal representing the current lateral position of the tape head servo sensor, thereby acquiring the track following servo pattern. Lastly, upon acquiring the track following servo pattern, the servo loop logic operates the servo loop to track follow the sensed servo signals at the desired specific position error signal representing a desired displacement from a linear servo edge.

Method and tape drive embodiments of the invention are also shown.

In another embodiment, wherein the track following servo pattern comprises a middle recorded servo signal, and outer recorded servo signals, such that the sensed servo signals comprise a plateau when only an outer recorded servo signal is sensed by the tape head servo sensor, the servo loop logic, detects the sensed servo signals by detecting the plateau servo signals.

In a further embodiment, wherein the position error signals comprise detected ratios of the sensed servo signals when the servo sensor senses both the outer recorded servo signal and the middle recorded servo signal, the ratios comprising ratios of the outer signal to the sum of the middle and outer signals, the ratios having a slope; the servo loop logic, subsequent to detecting the plateau servo signals, and decelerating the slewing rate, upon detecting the slope of the determined ratios, adjusts the slew rate to a further decelerated slew rate relative to the track following servo pattern, such that the further decelerated slew rate adjusts for the lateral movement of the magnetic tape.

In a still further embodiment, wherein the servo loop logic, in locking the servo loop to the position error signal representing the current lateral position of the tape head servo sensor, monitors the determined ratios, and, upon the determined ratio equaling a threshold value indicating that the servo sensor is near the edge, locks the servo loop.

In another embodiment, the servo loop logic initially moves the servo sensor to the off-track position as determined from the independent position sensor. As above, the off-track position is at a known side of, and displaced from, the track following servo pattern.

For a fuller understanding of the present invention, reference should be made to the following detailed description taken in conjunction with the accompanying drawings.

BRIEF DESCRIPTION OF THE DRAWINGS

FIG. 4 is a diagrammatic representation of the ratios between the sensed servo signals of a set of servo edges of the magnetic tape of FIGS. 2 and 3 at various lateral positions;

FIG. 5 is a flow chart depicting an embodiment of the present invention for detecting and acquiring a track following servo pattern of a magnetic tape; and FIG. 6 is a diagrammatic representation of sensed servo signals and independent position sensor signals of the magnetic tape drive of FIG. 1.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
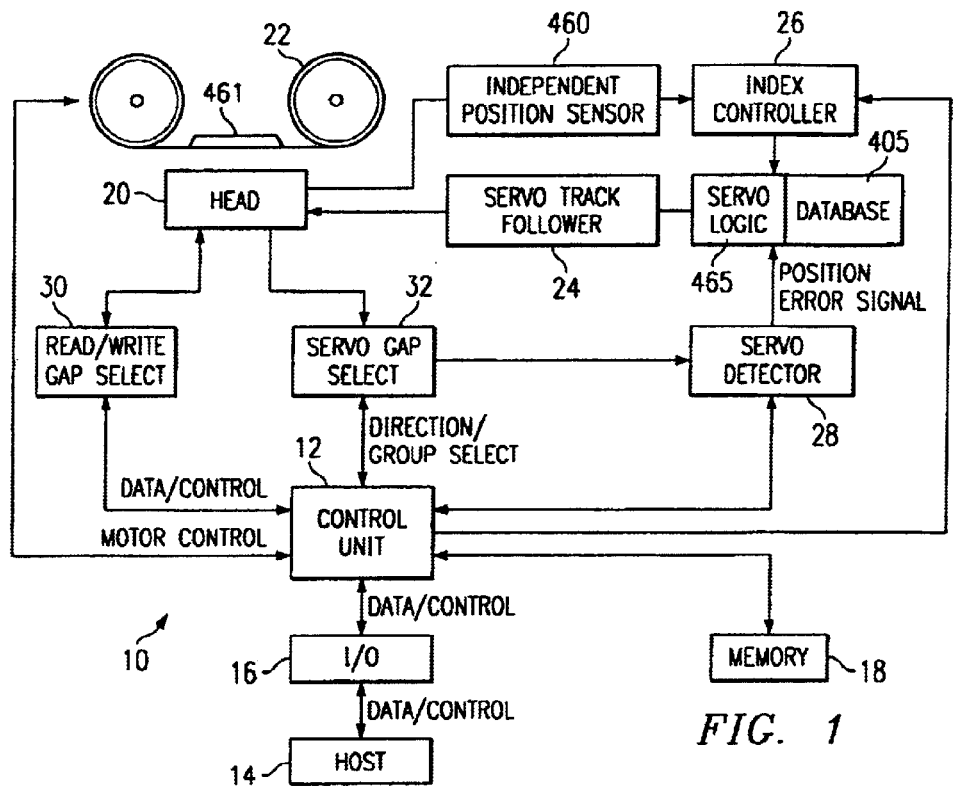
FIG. 1 is block diagram of an embodiment of a magnetic tape storage system employing the present invention to detect and acquire a track following servo pattern recorded on a magnetic tape.

Referring to FIG. 1, a magnetic tape data storage system 10 is illustrated. One example of a magnetic tape data storage system in which the track following servo pattern detection and acquisitions system of the present invention may be employed is the IBM 3590 Magstar magnetic tape subsystem, but with open channel guiding at the magnetic head, such that the magnetic tape is subject to lateral movement. A control unit 12 is provided which receives and transmits data and control signals to and from a host device 14 via an interface 16. The control unit 12 is coupled to a memory device 18, such as a random access memory for storing information and computer programs. An example of a host device 14 comprises an IBM RS/600 processor.

A multi-element tape head 20, such as is well known in the art, includes a plurality of data read/write elements to record and read data onto and from a magnetic tape 22, and servo sensors or read elements to read servo signals comprising prerecorded linear servo edges on the magnetic tape 22.

A tape reel motor system (not shown) of the tape data storage system moves the tape 22 in the longitudinal direction while it is supported by a tape deck 461 for reading and writing. The tape deck does not precisely hold the tape in position laterally. For example, open channel guiding is employed in which the magnetic tape can move laterally a distance which is substantially greater than that between index positions, and may be greater than the width of at least half of the servo pattern. Alternatively, the tape may be guided, but the track density is such that the lateral movement is excessive.

A servo track follower 24 directs the motion of the magnetic tape head 20 in a lateral or transverse direction relative to the longitudinal direction of tape motion. The control unit 12 is coupled to the tape reel motors and controls the direction, velocity and acceleration of the tape 22 in the longitudinal direction.

The data tracks on the tape 22 are arranged in parallel and are parallel to the linear servo edges. Thus, as the servo track follower 24 causes the servo sensors of the magnetic tape head to track follow a linear servo edge or a servo index position laterally offset from a servo edge, the data read/write elements track a parallel group of the data tracks. If it is desired to track another parallel group of data tracks, the magnetic tape head 20 is indexed laterally to another servo edge or to another servo index position, or a different servo sensor is aligned with the same or a different servo edge or servo index position.

When the magnetic tape head 20 is to be moved to a selected index position, an index controller 26 is enabled by the control unit 12, receiving a mechanical lateral position signal from an independent position sensor 460 and transmits an appropriate signal to servo loop logic 465 to select the appropriate servo track, while the control unit 12 transmits an appropriate signal to a servo gap selector 32 to select the appropriate servo sensor. The independent position sensor 460 is discussed in the incorporated U.S. Pat. No. 5,946,159, where it is called a non-servo position sensor, and indicates the lateral mechanical position of the tape head 20 with respect to the tape deck 461. The servo loop logic 465 may comprise a programmed PROM, ASIC or microprocessor. The tape system 10 may be bidirectional, in which ones of the read/write elements are selected for one direction of movement, and others of the read/write elements are selected for the opposite direction of movement. The control unit 12 additionally selects the appropriate ones of the read/write elements by transmitting a signal to a read/write gap select unit 30.

Once a servo edge or edges are selected, the servo gap selector 32 provides the servo signals to a servo detector 28, which information is employed by servo loop logic 465 to position the tape head 20 to track follow the detected edges.

The track following servo logic is implemented in the servo loop logic 465, employing a database 405, and may comprise the servo logic of the incorporated U.S. patent application Ser. No. 09/413,327, employing the sensed servo signals to determine the ratios of the sensed servo signals.

Figure 2:
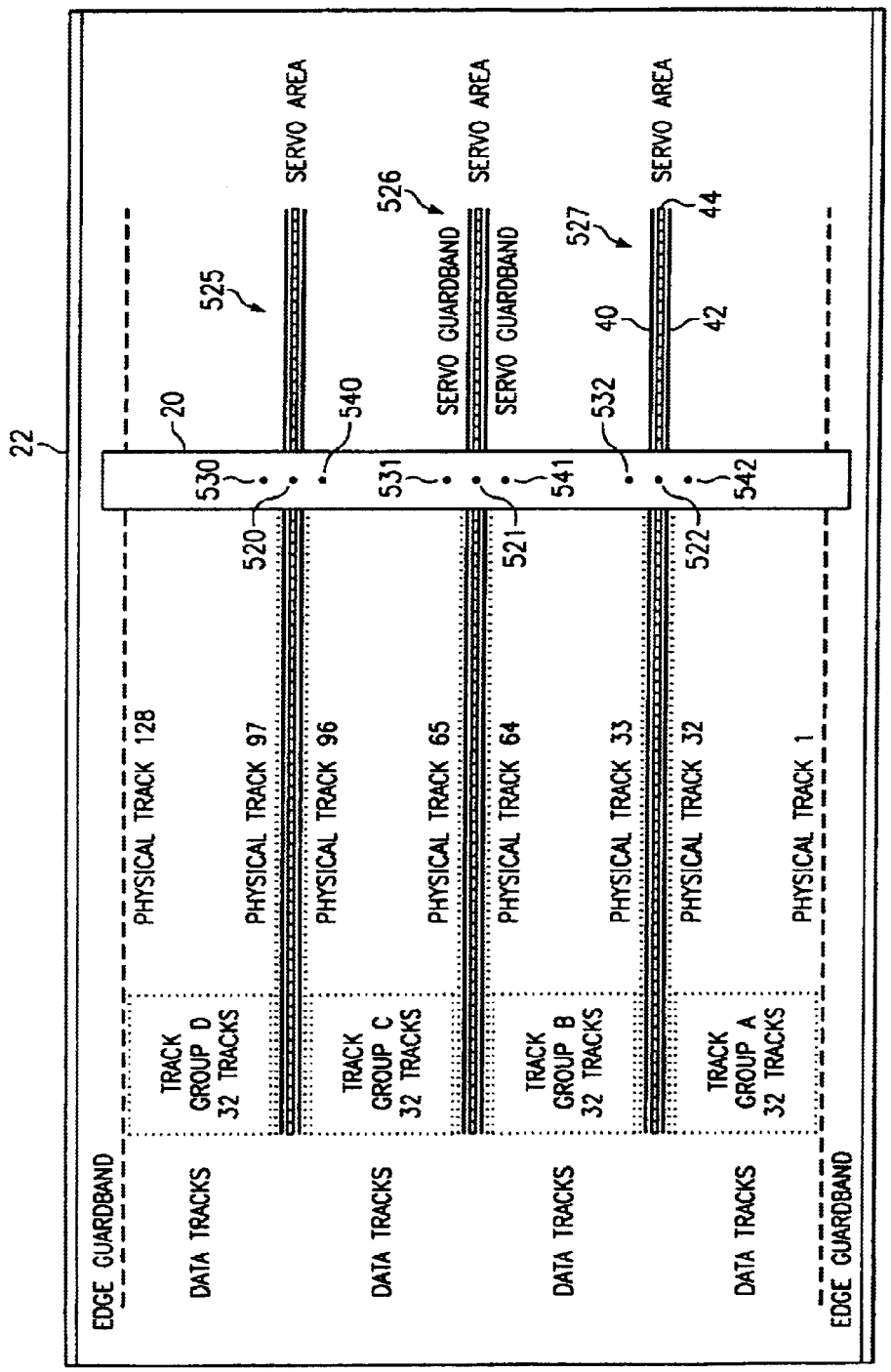
FIG. 2 is a diagrammatic illustration of a magnetic tape having three parallel sets of linear servo edges, each servo edge comprising an interface between two dissimilar recorded servo signals.

Referring to FIG. 2, a plurality, for example, three, parallel sets of linear servo edges 525, 526 and 527 are illustrated, each servo edge comprising an interface between two dissimilar recorded servo signals, each set of servo edges comprising one of the servo edges on each of opposite lateral sides of a middle recorded servo signal. As an example, a corresponding plurality of laterally offset servo sensors 520–522 are spaced apart in the tape head to sense the servo signals at each corresponding edge. Additional pluralities of servo sensors 530–532 and 540–542 may be provided to allow positioning of the tape head at additional data tracks.

Figure 3:
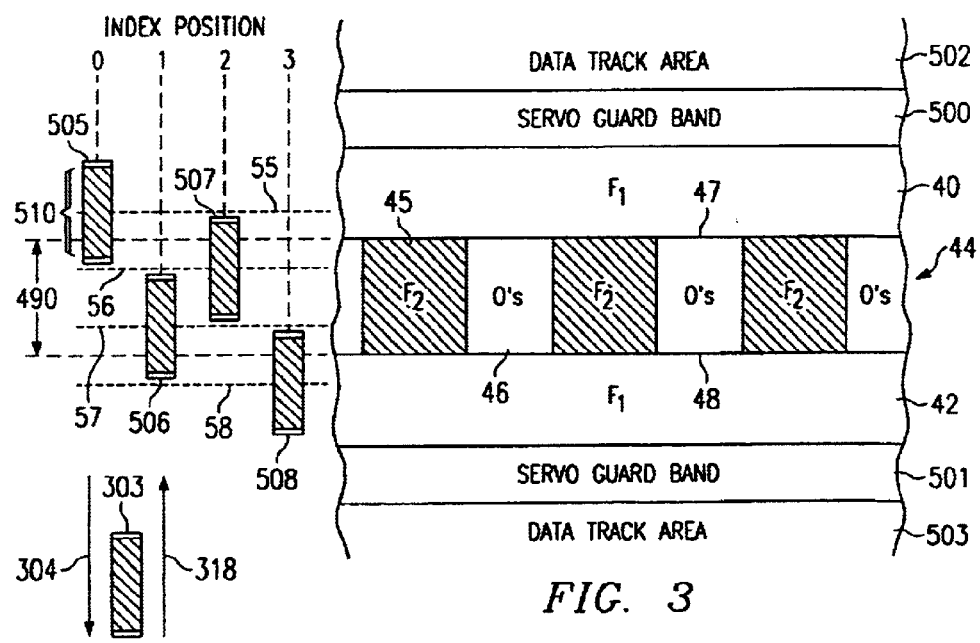
FIG. 3 is a diagrammatic representation of a magnetic tape format providing four servo index positions in one set of two linear servo edges of the magnetic tape of FIG. 2, and showing an off-track position of the servo sensor.

Referring to FIG. 3, the typical magnetic tape format of servo signals to form linear servo edges 47 and 48 comprising an interface between two dissimilar recorded servo signals is illustrated. One set of servo edges comprises outer bands 40 and 42, having a recorded pattern of a constant amplitude signal of a single first frequency, on either side of an inner, or middle, band 44 of the other servo signal, having a binary recorded pattern alternating between a constant amplitude burst signal 45 of a single second frequency and a zero amplitude null signal 46. Alternatively, the middle recorded signal 44 may comprise a constant second frequency.

Typically, the servo signals 40–44 are provided with servo guard bands 500 and 501 to protect the outer bands 40 and 42 from noise resulting from the data track areas 502 and 503.

Three servo sensors 520–522, etc., of FIG. 2 are employed to sense the three servo tracks 525–527 simultaneously, and, the average of the servo signals may be employed to track follow the servo tracks.

To increase data track density, servo index positions 55, 56, 57 and 58 are provided which are laterally offset with respect to the sensed servo edges of the set of linear servo edges. As an example, the servo index positions may be offset laterally about one quarter the width of the inner band 44 away from the servo edge in either direction, providing four index positions. Servo sensors 505, 506, 507 and 508 are provided and are substantially the same sensing width 510 as the predetermined distance 490. The indexed positions are determined by measuring the ratio between the amplitudes of the two dissimilar recorded servo signals, e.g., as measured by the servo detector 28 of FIG. 1, and called the "position error signal", or "PES". The servo logic 465 operates the servo track follower 24 to track follow at the desired measured ratio. For example, the measured ratio will be the ratio between the sensed outer band signal 40, giving effect to the null 46, and the sum of the sensed outer band signal 40 plus the inner band signal 45. The illustrations and descriptions herein employ this ratio. Alternatively, the measured ratio may be the ratio between the outer band signal 40 at frequency $F_1$ and the inner band signal 45 at frequency $F_2$.

FIG. 4 illustrates ratios related to the two dissimilar recorded servo signals as determined by the servo detector, the ratios representing the lateral position of the servo head with respect to each of the edges. Thus, the trace 700 represents the ratios at different displacements with respect to one edge, and the trace 701 represents the ratios at different displacements with respect to the other edge. The ratio illustrated is the ratio of the outer band signal amplitude to the (outer band signal amplitude+the inner band signal amplitude). The lateral displacement of "0" represents the centered-on-edge ratio at one edge, such as the lower edge 48 in FIG. 3, and the lateral displacement of "80" represents the centered-on-edge ratio at the other edge, such as the upper edge 47 in FIG. 3. In the illustrated example, the distance between the edges is 80 microns. If no part of the servo head was on the inner band and the head was totally on an outer band, the ratio would be substantially 1.00, and appear as a plateau, and, if the servo head were in the exact center of the inner band so that no part of either outer band was being read, the ratio would be substantially 0.00. Thus, the determined ratios are sloped from the ratio of substantially 1.00 to the center ratio of substantially 0.00. As is known to those of skill in the art, the ratios do not actually reach the theoretical end points of 1.00 or 0.00, due, for example, to electronic noise in the detection circuits, to media noise from the tape, and to defects on the tape. In the example of FIG. 3, the nominal alignment of the servo head at the centered-on-edge position "0" or "80" is approximately at a ratio of "0.60". Those of skill in the art will understand that many different specific dimensions may be employed, and many similar ratios may be designed, the illustrated ratio providing a high degree of sensitivity to displacement and low sensitivity to noise.

In the illustrated example, the index servo positions are displaced 20 microns from the edges, equal to 25% of the predetermined distance between the edges. Thus, index servo position 55 from FIG. 3 is at approximately +20 microns and index servo position 56 is at approximately −20 microns from edge 47, and index servo position 57 is at approximately +20 microns and index servo position 58 is at approximately −20 microns from edge 48. These servo positions, however, must be followed by the track following servo and not mechanically due to the substantial (in comparison to the small track spacings) lateral movements of the tape media and of the servo tracks on the moving tape media. Hence, the servo positions are followed at particular ratios. For example, index servo position 55 is followed at the ratio 705, index servo position 56 is followed at the ratio 706, index servo position 57 is followed at the ratio 707, and index servo position 58 is followed at the ratio 708.

To track follow an edge or edges, once a servo edge or edges are selected, the servo gap selector 32 of FIG. 1 provides the servo signals to a servo detector 28, which digitally detects the servo signals at a predetermined sample rate, and provides the position error signal (PES) or ratios of each of the selected servo sensors 520–522, 530–532 or 540–542 of FIG. 2. The servo logic 465 employs the detected ratios (PES) to determine the displacement from the edges and operates the servo loop servo track follower 24 to position the tape head 20 to track follow at the desired displacement or offset from the edges.

A function of magnetic tape is to maximize the data stored on the tape by insuring that there are only limited gaps between groups of data. One method of accomplishing this function is to operate the tape reel motor system to stop the longitudinal movement of the magnetic tape 22 of FIG. 1 at the end of a group of data, and "backhitch", or reverse the direction of the longitudinal movement of the tape to beyond the end of the previous data, stop the tape again, and accelerate the tape up to speed in the original direction by the time that the end of the previous data is reached.

When the magnetic tape is guided in a guided tape path, the magnetic tape tends to stay in nearly the same lateral position as it is backhitched, so that the servo sensor or sensors 520–522, 530–532 or 540–542 of FIG. 2 are on the track following servo pattern at nearly the correct offset when it is accelerated up to speed in the original direction, and the servo system can move to the desired index position by the time the next data is to be written.

In open channel guiding, the lateral movement of the magnetic tape is much greater. A complication is that the servo signals on one side of the track following servo pattern, e.g., trace 700 of FIG. 4, are similar to those on the other side of the pattern, e.g., trace 701, differing only in the direction of slope of the ratios. Thus, a single sample will not indicate the side of track following servo pattern, and any adjustment based on that sample in what is thought to be the correct direction will move the servo sensor off of the servo pattern, such that the servo system may become lost. Further, the lateral movement of the magnetic tape may be so great that the servo sensor is off of the track following servo pattern entirely when the longitudinal direction of the tape is started in the original direction. No servo position information is available once one moves outside the pattern. The independent position sensor 460 of FIG. 1, such as that of U.S. Pat. No. 5,946,159, cannot be relied on to determine the correct position within a servo pattern, when such large tape movements are involved.

Referring to FIGS. 5 and 6, the active acquiring of the track following servo pattern in accordance with an embodiment of the present invention, for example, after a "backhitch" operation, commences at step 300.

Initially, in step 301, the servo loop logic 465 of FIG. 1 operates the servo loop track follower 24 to move the head 20 and its servo sensors to an off-track position as determined from the independent position sensor 460. The off-track position of the tape head servo sensor is at a known side of, and displaced from, the track following servo pattern, for example, as shown by movement of servo sensor 303 of FIG. 3 in the direction of arrow 304. In FIG. 6, trace 308 represents the instantaneous position indicated by the independent position sensor 460 of FIG. 1. The instantaneous position error signal derived from a first servo sensor, e.g., servo sensor 530 of FIG. 2, is depicted by trace 310, the position error signal derived from a second servo sensor, e.g., servo sensor 531 of FIG. 2, is depicted by trace 311, and the position error signal derived from a third servo sensor, e.g., servo sensor 532 of FIG. 2, is depicted by trace 312. Since the traces overlap, they will be referred to hereinafter collectively as PES 314. Trace 315 represents the average PES 314 with an offset, such that when the servo sensor is positioned at an index offset, such as at index position ratio 705 of FIG. 4, the PES 314 will be at the value shown as point 705, whereas trace 315 will be at a value of zero.

Step 301 of FIG. 5 is represented by bracket 320 of FIG. 6, wherein the independent position sensor 460 (trace 308) is employed to move the head 20 and its servo sensors to an off-track position. In the off-track position, the servo sensors (trace 314) detect only noise or signals not within the range of frequencies of the servo pattern.

Upon movement of the tape head servo sensor to the off-track position, the servo loop logic, in step 321, operates the servo loop to slew the tape head 20 and thereby, the tape head servo sensors, e.g., servo sensors 530–532, laterally toward the track following servo pattern at a rate greater than the maximum rate of the lateral movement of the magnetic tape, as represented by arrow 318 of FIG. 3. The servo loop logic 465 monitors the signals of the servo sensor in step 322 as the tape head servo sensor is slewed, to detect when the noise stops, and, in steps 326 and 327, to detect the servo signals. So long as the noise predominates and the servo signals are not detected in step 322, step 321 continues movement of the tape head towards the servo pattern. In step 326, the servo logic continues to move the tape head once the servo sensor is providing coherent sensed signals, so as to allow the servo loop to determine the servo signals in step 327. In one embodiment, wherein the track following servo pattern comprises a middle recorded servo signal, e.g., signal 44 of FIG. 3, and outer recorded servo signals 40 and 42, such that the sensed servo signals comprise a plateau when only the outer recorded servo signal is sensed by the tape head servo sensor, the servo loop logic, in step 327, detects the sensed servo signals by detecting the plateau servo signals. As discussed above, the plateau comprises ratios nearing 1.00.

In FIG. 6, steps 321 and 322 are represented by bracket 330, and steps 326 and 327 are represented by bracket 331.

Upon detecting the sensed servo signals in step 327, the servo loop logic, in step 335, decelerates the slewing rate, and, in step 336, looks for detection of the servo track following pattern. In the embodiment of FIGS. 3 and 4, wherein the position error signals comprise detected ratios (traces 700 and 701) of the sensed servo signals when the servo sensor senses both the outer recorded servo signal, e.g., band 40, and the middle recorded servo signal, e.g., band 44, the ratios comprising ratios of the outer signal to the sum of the middle and outer signals, the ratios having a slope; the servo loop logic 465 of FIG. 1, subsequent to detecting the plateau servo signals, and decelerating the slewing rate, in step 336, looks for the slope of the determined ratios. Step 336 is represented in FIG. 6 by bracket 340.

Upon detecting the slope of the determined ratios, the servo loop logic 465 of FIG. 1, in step 344, adjusts the slew rate to a further decelerated slew rate relative to the track following servo pattern, such that the further decelerated slew rate adjusts for the lateral movement of the magnetic tape. Since the slope of the ratios has been detected, the direction of movement along the slope is discernible to the servo loop logic. Hence, the servo logic continues the movement of the tape head toward the center of the servo pattern, while adjusting for any movement of the magnetic tape.

While conducting step 344, the servo loop logic, in step 345, looks for a lockable servo signal. Steps 344 and 345 are represented in FIG. 6 by bracket 350. Upon detecting in step 345 that the sensed servo signals are within a lock window tolerance, the servo loop logic, in step 352, locks the servo loop to a position error signal representing the current lateral position of the tape head servo sensor, thereby acquiring the track following servo pattern. In one embodiment, the servo loop logic, in looking for the lockable signal to lock the servo loop to the position error signal representing the current lateral position of the at least one tape head servo sensor, monitors the determined ratios, and, upon the determined ratio equaling a threshold value indicating that the servo sensor is near the edge, locks the servo loop.

Next, in step 355, upon acquiring the track following servo pattern, the servo loop logic 465 of FIG. 1 operates the servo loop to track follow the sensed servo signals at the desired specific position error signal representing a desired displacement from a linear servo edge. In one embodiment, the servo loop logic steadily ramps the PES offset until the offset of the desired index position has been reached. This shifts the PES offset after the servo loop is locked and avoids transients that would otherwise occur as the head is slewed to the desired offset. Step 355 of this embodiment is represented by bracket 359 of FIG. 6. As an optional step, the servo loop logic, in step 360, allows a preset time interval for the servo loop to clearly settle and to verify that the acquisition was successful. Step 360 is represented in FIG. 6 by bracket 365.

At the end of step 360, if the acquisition was successful, the servo loop logic may report, in step 370, that the lock has been acquired, and the servo loop will then operate the servo loop to perform the normal track following function of following the servo signal at the desired offset PES ratio for allowing the reading and/or writing of data on the associated data tracks.

Alternatively, servo tracks may be employed which do not have the ratio structure discussed above, and the servo acquisition steps are similar, employing the alternative servo structure.

While the preferred embodiments of the present invention have been illustrated in detail, it should be apparent that modifications and adaptations to those embodiments may occur to one skilled in the art without departing from the scope of the present invention as set forth in the following claims.

We claim:

1. A servo system for detecting and acquiring a track following servo pattern of a magnetic tape, wherein said magnetic tape is subject to lateral motion, said magnetic tape having a track following servo pattern of at least one set of parallel linear servo edges, each said servo edge comprising an interface between two dissimilar recorded servo signals, each said set of servo edges comprising one of said servo edges on each of opposite lateral sides of a middle said recorded servo signal, said servo system comprising:

at least one servo sensor of a tape head, said tape head movable laterally of said magnetic tape, said at least one servo sensor sensing said recorded servo signals of said magnetic tape and providing sensed servo signals;
a servo loop for positioning said tape head laterally with respect to said magnetic tape; and
servo loop logic coupled to said at least one servo sensor and to said servo loop, said servo loop logic:
  initially, from an off-track position of said at least one tape head servo sensor at a known side of, and displaced from, said track following servo pattern, operates said servo loop to slew said at least one tape head servo sensor laterally toward said track following servo pattern at a rate greater than the maximum rate of said lateral movement of said magnetic tape;
  monitors said signals of said at least one servo sensor as said tape head servo sensor is slewed, to detect said servo signals;
  upon detecting said sensed servo signals, decelerates said slewing rate;
  upon detecting that said sensed servo signals are within a lock window tolerance, locks said servo loop to a position error signal representing the current lateral position of said at least one tape head servo sensor, thereby acquiring said track following servo pattern; and
  upon acquiring said track following servo pattern, operates said servo loop to track follow said sensed servo signals at specific position error signals representing displacements from said at least one linear servo edge.

2. The servo system of claim 1, wherein said track following servo pattern comprises said middle recorded servo signal, and outer recorded servo signals, such that said sensed servo signals comprise a plateau when only said outer recorded servo signal is sensed by said at least one tape head servo sensor, and wherein said servo loop logic, in detecting said sensed servo signals, comprises detecting said plateau servo signals.

3. The servo system of claim 2, wherein said position error signals comprise determined ratios of said sensed servo signals, when said at least one servo sensor senses both said outer recorded servo signal and said middle recorded servo signal, said determined ratios comprising ratios of said outer signal to a sum of said middle and outer signals, said ratios having a slope; and additionally, said servo loop logic:
  subsequent to detecting said plateau servo signals, and decelerating said slewing rate, upon detecting said slope of said determined ratios, adjusts said slew rate to a further decelerated slew rate relative to said track following servo pattern, such that said further decelerated slew rate adjusts for said lateral movement of said magnetic tape.

4. The servo system of claim 3, wherein said servo loop logic, in locking said servo loop to said position error signal representing the current lateral position of said at least one tape head servo sensor, comprises monitoring said determined ratios, and, upon said determined ratio equaling a threshold value indicating that said at least one servo sensor is near said edge, locking said servo loop.

5. The servo system of claim 4, wherein said servo system additionally is capable of track following a plurality of servo index positions laterally offset from at least one of said linear servo edges as determined by said ratios, said servo loop logic additionally:
  subsequent to locking said servo loop, ramps a desired said position error signal to a desired said servo index position having a position error signal representing a desired displacement from said at least one linear servo edge.

6. A servo system for detecting and acquiring a track following servo pattern of a magnetic tape, wherein said magnetic tape is subject to lateral motion, said magnetic tape having a track following servo pattern of at least one set of parallel linear servo edges, each said servo edge comprising an interface between two dissimilar recorded servo signals, each said set of servo edges comprising one of said servo edges on each of opposite lateral sides of a middle said recorded servo signal, said servo system comprising:

at least one servo sensor of a tape head, said tape head movable laterally of said magnetic tape, said at least one servo sensor sensing said recorded servo signals of said magnetic tape and providing sensed servo signals;

a servo loop for positioning said tape head laterally with respect to said magnetic tape;

an independent position sensor to sense lateral position of said magnetic tape with respect to said tape head servo sensor; and servo loop logic coupled to said at least one servo sensor, to said servo loop, and to said independent position sensor, said servo loop logic:

initially, moves said at least one servo sensor to an off-track position as determined from said independent position sensor, said off-track position at a known side of, and displaced from, said track following servo pattern;

from said off-track position of said at least one tape head servo sensor, operates said servo loop to slew said at least one tape head servo sensor laterally toward said track following servo pattern at a rate greater than the maximum rate of said lateral movement of said magnetic tape;

monitors said signals of said at least one servo sensor as said tape head servo sensor is slewed, to detect said servo signals;

upon detecting said sensed servo signals, decelerates said slewing rate;

upon detecting that said sensed servo signals are within a lock window tolerance, locks said servo loop to a position error signal representing the current lateral position of said at least one tape head servo sensor, thereby acquiring said track following servo pattern; and upon acquiring said track following servo pattern, operates said servo loop to track follow said sensed servo signals.

7. A method for detecting and acquiring a track following servo pattern of a magnetic tape in a track following servo system, wherein said magnetic tape is subject to lateral motion, said magnetic tape having a track following servo pattern of at least one set of parallel linear servo edges, each said servo edge comprising an interface between two dissimilar recorded servo signals, each said set of servo edges comprising one of said servo edges on each of opposite lateral sides of a middle said recorded servo signal, said track following servo system comprising at least one servo sensor of a tape head for sensing said recorded servo signals of said magnetic tape and providing sensed servo signals, and a servo loop for positioning said tape head laterally with respect to said magnetic tape to track follow said sensed servo signals at specific position error signals representing displacements from said at least one linear servo edge, said method comprising the steps of:

from an off-track position at a known side of, and displaced from, said track following servo pattern, slewing said at least one tape head servo sensor laterally toward said track following servo pattern at a rate greater than the maximum rate of said lateral movement of said magnetic tape;

monitoring said signals of said at least one servo sensor as said tape head servo sensor is slewed, to detect said servo signals;

upon detecting said sensed servo signals, decelerate said slewing rate;

upon detecting that said sensed servo signals are within a lock window tolerance, locking said servo system to a position error signal representing the current lateral position of said at least one tape head servo sensor, thereby acquiring said track following servo pattern; and upon acquiring said track following servo pattern, track following said sensed servo signals at specific position error signals representing displacements from said at least one linear servo edge.

8. The method of claim 7, wherein said track following servo pattern comprises said middle recorded servo signal, and outer recorded servo signals, such that said sensed servo signals comprise a plateau when only said outer recorded servo signal is sensed by said at least one tape head servo sensor, and wherein said step of detecting said sensed servo signals comprises detecting said plateau servo signals.

9. The method of claim 8, wherein said position error signals comprise determined ratios of said sensed servo signals, when said at least one servo sensor senses both said outer recorded servo signal and said middle recorded servo signal, said determined ratios comprising ratios of said outer signal to a sum of said middle and outer signals, said ratios having a slope; and said method comprising the additional step of:

subsequent to detecting said plateau servo signals, and decelerating said slewing rate, upon detecting said slope of said determined ratios, adjusting said slew rate to a further decelerated slew rate relative to said track following servo pattern, such that said further decelerated slew rate adjusts for said lateral movement of said magnetic tape.

10. The method of claim 9, wherein said step of locking said servo system to said position error signal representing the current lateral position of said at least one tape head servo sensor, comprises monitoring said determined ratios, and conducting said locking step upon said determined ratio equaling a threshold value indicating that said at least one servo sensor is near said edge.

11. The method of claim 10, wherein said servo system additionally comprises a plurality of servo index positions laterally offset from at least one of said linear servo edges as determined by said ratios, and said method comprising the additional step of:

subsequent to said locking step, ramping a desired said position error signal to a desired said servo index position having a position error signal representing a desired displacement from said at least one linear servo edge.

12. A method for detecting and acquiring a track following servo pattern of a magnetic tape in a track following servo system, wherein said magnetic tape is subject to lateral motion, said magnetic tape having a track following servo pattern of at least one set of parallel linear servo edges, each said servo edge comprising an interface between two dissimilar recorded servo signals, each said set of servo edges comprising one of said servo edges on each of opposite lateral sides of a middle said recorded servo signal, said track following servo system comprising at least one servo sensor of a tape head for sensing said recorded servo signals of said magnetic tape and providing sensed servo signals, a servo loop for positioning said tape head laterally with respect to said magnetic tape to track follow said sensed servo signals at specific position error signals representing displacements from said at least one linear servo edge, and an independent position sensor to sense lateral position of said magnetic tape with respect to said tape head servo sensor, said method comprising the steps of:

initially moving said at least one servo sensor to an off-track position as determined from said independent position sensor, said off-track position at a known side of, and displaced from, said track following servo pattern;

from said off-track position, slewing said at least one tape head servo sensor laterally toward said track following servo pattern at a rate greater than the maximum rate of said lateral movement of said magnetic tape;

monitoring said signals of said at least one servo sensor as said tape head servo sensor is slewed, to detect said servo signals;

upon detecting said sensed servo signals, decelerate said slewing rate;

upon detecting that said sensed servo signals are within a lock window tolerance, locking said servo system to a position error signal representing the current lateral position of said at least one tape head servo sensor, thereby acquiring said track following servo pattern; and upon acquiring said track following servo pattern, track following said sensed servo signals.

13. A tape drive for reading and/or writing information with respect to magnetic tape, wherein said magnetic tape is subject to lateral motion, said magnetic tape having a track following servo pattern of at least one set of parallel linear servo edges extending in a longitudinal direction of said magnetic tape, each said servo edge comprising an interface between two dissimilar recorded servo signals, each said set of servo edges comprising one of said servo edges on each of opposite lateral sides of a middle said recorded servo signal, said tape drive comprising:

a motion system for moving said magnetic tape in said longitudinal direction;

a tape head for reading and/or writing data with respect to said magnetic tape, said tape head movable laterally of said magnetic tape;

at least one servo sensor of a tape head, said tape head movable laterally of said magnetic tape, said at least one servo sensor sensing said recorded servo signals of said magnetic tape and providing sensed servo signals;

a servo loop for positioning said tape head laterally with respect to said magnetic tape; and servo loop logic coupled to said at least one servo sensor and to said servo loop, said servo loop logic:

initially, from an off-track position of said at least one tape head servo sensor at a known side of, and displaced from, said track following servo pattern, operates said servo loop to slew said at least one tape head servo sensor laterally toward said track following servo pattern at a rate greater than the maximum rate of said lateral movement of said magnetic tape;

monitors said signals of said at least one servo sensor as said tape head servo sensor is slewed, to detect said servo signals;

upon detecting said sensed servo signals, decelerates said slewing rate;

upon detecting that said sensed servo signals are within a lock window tolerance, locks said servo loop to a position error signal representing the current lateral position of said at least one tape head servo sensor, thereby acquiring said track following servo pattern; and upon acquiring said track following servo pattern, operates said servo loop to track follow said sensed servo signals at specific position error signals representing displacements from said at least one linear servo edge.

14. The tape drive of claim 13, wherein said track following servo pattern comprises said middle recorded servo signal, and outer recorded servo signals, such that said sensed servo signals comprise a plateau when only said outer recorded servo signal is sensed by said at least one tape head servo sensor, and wherein said servo loop logic, in detecting said sensed servo signals, comprises detecting said plateau servo signals.

15. The tape drive of claim 14, wherein said position error signals comprise determined ratios of said sensed servo signals, when said at least one servo sensor senses both said outer recorded servo signal and said middle recorded servo signal, said determined ratios comprising ratios of said outer signal to a sum of said middle and outer signals, said ratios having a slope; and additionally, said servo loop logic:

subsequent to detecting said plateau servo signals, and decelerating said slewing rate, upon detecting said slope of said determined ratios, adjusts said slew rate to a further decelerated slew rate relative to said track following servo pattern, such that said further decelerated slew rate adjusts for said lateral movement of said magnetic tape.

16. The tape drive of claim 15, wherein said servo loop logic, in locking said servo loop to said position error signal representing the current lateral position of said at least one tape head servo sensor, comprises monitoring said determined ratios, and, upon said determined ratio equaling a threshold value indicating that said at least one servo sensor is near said edge, locking said servo loop.

17. The tape drive of claim 16, wherein said servo system additionally is capable of track following a plurality of servo index positions laterally offset from at least one of said linear servo edges as determined by said ratios, said servo loop logic additionally:

subsequent to locking said servo loop, ramps a desired said position error signal to a desired said servo index position having a position error signal representing a desired displacement from said at least one linear servo edge.

18. A tape drive for reading and/or writing information with respect to magnetic tape, wherein said magnetic tape is subject to lateral motion, said magnetic tape having a track following servo pattern of at least one set of parallel linear servo edges extending in a longitudinal direction of said magnetic tape, each said servo edge comprising an interface between two dissimilar recorded servo signals, each said set of servo edges comprising one of said servo edges on each of opposite lateral sides of a middle said recorded servo signal, said tape drive comprising:

a motion system for moving said magnetic tape in said longitudinal direction;

a tape head for reading and/or writing data with respect to said magnetic tape, said tape head movable laterally of said magnetic tape;

at least one servo sensor of a tape head, said tape head movable laterally of said magnetic tape, said at least one servo sensor sensing said recorded servo signals of said magnetic tape and providing sensed servo signals;

a servo loop for positioning said tape head laterally with respect to said magnetic tape;

an independent position sensor to sense lateral position of said magnetic tape with respect to said tape head servo sensor; and servo loop logic coupled to said at least one servo sensor, to said servo loop, and to said independent position sensor, said servo loop logic:

initially, moves said at least one servo sensor to an off-track position as determined from said independent position sensor, said off-track position at a known side of, and displaced from, said track following servo pattern;

from said off-track position of said at least one tape head servo sensor, operates said servo loop to slew said at least one tape head servo sensor laterally toward said track following servo pattern at a rate greater than the maximum rate of said lateral movement of said magnetic tape;

monitors said signals of said at least one servo sensor as said tape head servo sensor is slewed, to detect said servo signals;

upon detecting said sensed servo signals, decelerates said slewing rate;

upon detecting that said sensed servo signals are within a lock window tolerance, locks said servo loop to a position error signal representing the current lateral position of said at least one tape head servo sensor, thereby acquiring said track following servo pattern; and upon acquiring said track following servo pattern, operates said servo loop to track follow said sensed servo signals.

* * * * *